April 6, 1937.  J. R. GAMMETER  2,076,079
METHOD OF MAKING MILK BOTTLE CAPS
Original Filed April 2, 1935
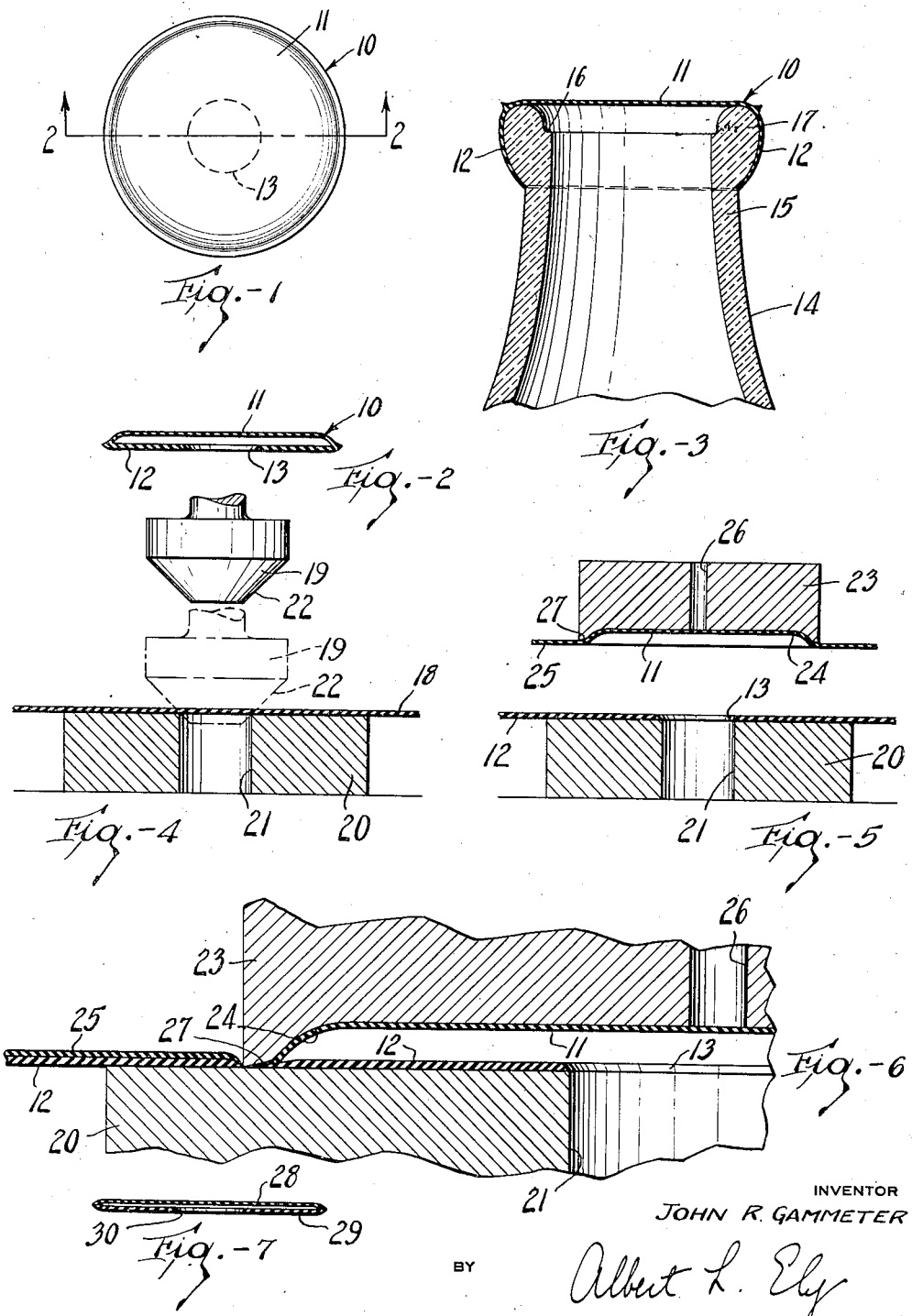
INVENTOR
JOHN R. GAMMETER
BY
Albert L. Ely
ATTORNEY Patented Apr. 6, 1937

2,076,079

UNITED STATES PATENT OFFICE 2,076,079

METHOD OF MAKING MILK BOTTLE CAPS

John R. Gammeter, Akron, Ohio, assignor of one-half to Susan G. Gammeter, Akron, Ohio Original application April 2, 1935, Serial No. 14,248. Divided and this application June 6, 1935, Serial No. 25,260

9 Claims. (Cl. 18—56)

This invention relates to improvements in milk bottle caps and the method by which the caps are produced and more particularly to caps made of rubber material which are inexpensive to manufacture and adapted to be applied to the bottle or other containers in a quick and simple manner and constitutes a division of my copending application Serial No. 14,248, filed April 2, 1935.

A further object of the invention is to provide an improved method of forming a cap having a substantially flat top portion adapted to extend across the opening in the bottle and a depending skirt portion engageable with the bead or outer portion of the bottle for retaining the cap in place, which cap before application on the bottle has its skirt portion extending substantially parallel with the top portion and in relatively close relation thereby providing a normally flat cap capable of being stacked one upon the other in a minimum of space.

A still further object of the invention is to provide an improved method of forming a cap of the type referred to in which the skirt portion is greatly tensioned in its application to the bottle but in which the top portion is appreciably free of tension to thereby permit expansion and contraction within the limits required without affecting the connection between the skirt portion and bottle.

Another object of the invention is to provide a cap made from sheet rubber material and vulcanized and which may be made in any desired color.

Additionally the invention contemplates the provision of a top portion of the cap made of transparent material to enable unobstructed reading of the printing on the regular type of paper disc when used in conjunction with the present cap.

With the objects above indicated and other objects hereinafter explained in view, the invention consists in cap construction and method by which the latter is produced.

Referring to the drawing:

Figure 1 is a top plan view of a cap embodying the present invention;

Figure 2 is a transverse sectional view taken on line 2—2 in Figure 1;

Figure 3 is a fragmentary sectional view of the neck portion of a bottle showing the manner in which the cap is reposed thereon;

Figures 4 to 6, inclusive, show steps in one method by which the cap may be produced;

Figure 7 is a transverse sectional view of a modified form of cap embodying the present invention.

In the drawing, referring particularly to Figures 1 to 3, inclusive, a milk bottle cap 10 is shown which may be made of rubber material or other similar yieldable material and comprises a top portion 11 which is substantially flat and in this instance of circular shape approximately the size of the bottle to which it is to be attached. A skirt portion 12 of similar shape has its marginal edge secured to the adjacent marginal edge of the top portion 11 in any suitable manner but preferably by vulcanization.

The skirt portion 12 normally extends in substantial parallelism with the top portion 11 and is provided with an opening 13 preferably centrally arranged. The cap 10 is made relatively flat so that they may be stacked one upon the other with the skirt portion 12 positioned upon the under side to afford ready application to the bottles. The cap 10 as made is free of any inherent tension in the top portion 11 and skirt portion 12 for a purpose to be later described.

In Figure 3 a glass milk bottle 14 is shown of the well-known type and has a neck portion 15 providing an opening through which the milk may be introduced into the bottle. A peripheral shoulder 16 is provided upon the inner side of the neck portion adjacent the open end and is adapted to receive the usual paper cap or closure to prevent the milk from accidentally spilling from the bottle. A circumferential bead 17 is formed on the outside of the bottle adjacent the open end which is intended to function as a gripping portion to permit the bottle to be readily picked up so it can be moved from one place to another.

In applying the cap 10 to the bottle 14 the skirt portion 12 is stretched by gripping the latter around the opening 13 until it passes freely over the bead 17 on the end of the bottle. The lower edge of the skirt is then released and it grips the bead 17 assuming the shape shown in Figure 3 or any other shape the bead may have, because of its yieldability or being made of rubber. It is frictionally maintained in contact with the bead 17 and being under tension prevents accidental disengagement. Due to the fact that the skirt portion 12 is originally made flat and substantially parallel with the top portion 11 the greatest tension is exerted at the lower edge adjacent the opening 13 and decreases from this point toward the marginal connection with the top portion 11. This decrease in tension is desirable because it is practically non-stretched at the marginal edge with the result that no tension is present in the top portion 11. The top portion 11 is originally made to approximately the diameter of the top of the bottle and consequently when in position thereon assumes a normal, unstretched condition. This is desirable inasmuch as should a sharp object such as ice come in contact with the top portion it will not puncture the same. Even though it should be punctured the opening will not be enlarged as the top portion is not under tension and therefore the milk will probably not leak therethrough. The cap will also stand chafing and will not tear because the top is free of tension. The skirt part which is under tension adheres to the bottle.

By providing a top portion 11 which is free from tension, breathing is permitted which consists of expansion and contraction of the contents within the bottle due to temperature changes resulting in a flexing of the top portion in opposite directions without any possibility of disengaging the cap from the bottle.

The cap may be made in various colors or combinations of colors by adding pigments to the unvulcanized rubber in a manner well-known in the art and combinations of material may be employed such as a rubber skirt portion connected to a top portion formed of a rubber hydrohalide film such as is disclosed in Calvert Patent No. 1,989,632, which is a product made by The Goodyear Tire & Rubber Company under the trade name "Pliofilm". Additionally the entire cap may be made of this material and being transparent has many advantages. In referring to a rubber hydrohalide film in both the specification and claims it is to be understood that I am referring to the product known as "Pliofilm".

These caps 10 may be easily applied to bottles preferably by machine operation and for convenience the caps 10 may be placed in a tubular container with one cap upon the other. One end of the container may be open to permit withdrawal of the caps, one at a time, with the skirt portion down and positioned adjacent the top of the bottle for ready application.

The cap 10 may be made by various processes, but one which I have found very desirable is to use unvulcanized or uncured calendered sheet rubber material, the steps of which are shown in Figures 4 to 6, inclusive. A sheet 18 of unvulcanized rubber of the desired thickness, preferably .015" to .02", is placed between cooperating dies 19 and 20, the latter having an opening 21 therein of the desired size. The upper die 19 is then moved toward the lower die 20 and has a tapered portion 22 which enters the opening 21 as shown in dotted lines in Figure 4. This punches the hole 13 in the skirt portion of the cap 10 and while only one hole is here shown it should be understood that the sheet 18 may be provided with many such holes.

After the punching operation a different upper die 23 is provided which has a recessed portion 24 formed upon its under side as shown in Figure 5. This recessed portion is circular in shape to correspond with the shape of the top of the bottle and of approximately the same diameter. A sheet 25 of unvulcanized or uncured rubber of the desired thickness, preferably .01", is placed upon the underside of the die 23 in superimposed relation with respect to the sheet 18 and a portion of the sheet is drawn up into the recessed portion 24 by means of vacuum effective through the provision of an opening 26 in the die 23 which may be connected to any suitable source for the purpose intended.

The dies 20 and 23 are then moved into engagement as shown in Figure 6 and the cap is cut out of the sheets leaving the top portion 11 and skirt portion 12 connected together at their marginal edges. To effect a proper seal or connection the underside of the die 23 is tapered upwardly and inwardly as shown at 27 at the desired angle to cause the marginal edges to cohere. Here again only one die 23 is shown, but it should be understood that a plurality of dies may be used which should align with the opening provided in the sheet 18. For production purposes a plurality of such dies is preferable.

The caps are then removed from the dies on separation of the latter and vulcanized according to any well known method. Preferably the caps are first dusted with soapstone or similar material to prevent sticking together and are then placed in a tubular container one on top of the other with the skirt portions extending in the same direction. This may be the container in which the caps are shipped or otherwise and when the container has been filled it is slowly rotated about its axis in the presence of warm air to vulcanize or cure the rubber. Rotating the caps prevents them adhering to one another and the formation of flat spots thereon.

The caps may also be cured in a temperature of approximately 150° F. for a period of eight hours. Suitable accelerators of course are incorporated in the unvulcanized sheets of rubber to speed up the vulcanization process according to the process used.

In Figure 7 a cap made of a rubber hydrohalide film is shown having a top portion 28 and skirt portion 29 having an opening 30 therein. These caps are blanked out according to the hereinbefore stated method but to form the seal between the marginal edges local heat is applied sufficiently to cause the edges to slightly melt and become joined together.

When the cap is made from a rubber hydrohalide film and uncured rubber, localized heat is likewise used to form the seal, but the rubber portion is afterwards cured at a low temperature of approximately 120° F. for a period of approximately 48 hours. This low temperature is used so that the rubber hydrohalide film will be unaffected by the vulcanizing of the rubber as it will stand a small amount of heat without injury.

With the rubber hydrohalide film caps it is sometimes necessary that they be heated to approximately 100° F. for efficient application to the bottles, but with the rubber caps this, of course, is not necessary as the rubber caps stretch sufficiently for application without permanent distortion.

While I have described the preferred embodiment of the invention it is to be understood that I am not to be limited thereto inasmuch as changes and modifications may be resorted to without departing from the spirit of the invention as defined in the appended claims.

What is claimed is:

1. That method of making milk bottle caps or the like which comprises placing substantially flat sheets of unvulcanized rubber in superimposed relation between cooperating dies, bringing the dies together to shape the cap and simultaneously uniting the marginal edges thereof, placing a plurality of the shaped caps in a tubular member, and slowly rotating the tubular member in the presence of heat to vulcanize the rubber.

2. That method of making milk bottle caps or the like which comprises placing substantially flat sheets of unvulcanized rubber in superimposed relation between cooperating dies, bringing the dies together to shape the cap and simultaneously uniting the marginal edges thereof, dusting the shaped cap, placing a plurality of the shaped and dusted caps in a tubular member, and slowly rotating the tubular member in the presence of heat to vulcanize the rubber.

3. A method of making caps for milk bottles and the like which comprises forming an annular opening in a sheet of pliable material, superimposing a second sheet of imperforate pliable material over said first sheet in substantially parallel relation therewith, providing a pair of annular parallel discs of substantially equal diameter and of larger size than said opening by cutting both sheets in a single operation, and uniting the marginal edges of said discs simultaneously with the cutting operation with said opening disposed substantially centrally of one of said discs.

4. A method as defined in claim 3 wherein said sheets of pliable material are sheets of unvulcanized rubber, and wherein said discs are vulcanized after being united.

5. That method of making milk bottle caps or the like which comprises placing substantially flat sheets of material, one composed of a rubber hydrohalide film and the other unvulcanized rubber, in superimposed relation between cooperating dies and bringing the dies together to shape the cap, one of said sheets having an opening therein, and simultaneously applying localized heat to the marginal portion thereof to soften the rubber hydrohalide film so as to produce a fused or cohered seal with the unvulcanized rubber material, and subsequently curing the unvulcanized rubber material by treatment at low temperature for a suitable time so as not to destroy the characteristics of the rubber hydrohalide film.

6. A method of making caps for milk bottles and the like which comprises forming an annular opening in a sheet of unvulcanized rubber, superimposing a second sheet of an imperforate rubber hydrohalide film over said first sheet in substantially parallel relation therewith, providing a pair of annular discs of substantially equal diameter and of larger size than said opening by cutting both sheets in a single operation, and applying localized heat to the margins of said discs to unite the marginal edges of said disc with said opening disposed substantially centrally thereof simultaneously with the cutting operation.

7. That method of making milk bottle caps or the like which comprises placing substantially flat sheets of material composed of a rubber hydrohalide film in superimposed relation between cooperating dies and bringing the dies together to shape the cap, one of said sheets having an opening therein, and simultaneously applying localized heat to the marginal portions thereof to soften the material so as to produce a fused or cohered seal.

8. That method of making milk bottle caps or the like which comprises placing substantially flat sheets of material composed of a rubber hydrohalide film in superimposed relation, one of said sheets having an opening therein, applying localized heat to the material to soften the latter about the marginal edge of the cap so as to produce a fused or cohered seal, and dieing out the cap to shape without interference with the seal.

9. A method of making caps for milk bottles and the like which comprises forming an annular opening in a sheet of rubber hydrohalide film, superimposing a second sheet of an imperforate rubber hydrohalide film over said first sheet in substantially parallel relation therewith, providing a pair of annular discs of substantially equal diameter and of larger size than said opening by cutting both sheets in a single operation, and applying localized heat to the margins of said discs to unite the marginal edges of said discs with said opening disposed substantially centrally thereof simultaneously with the cutting operation.

JOHN R. GAMMETER.